Figure 1:
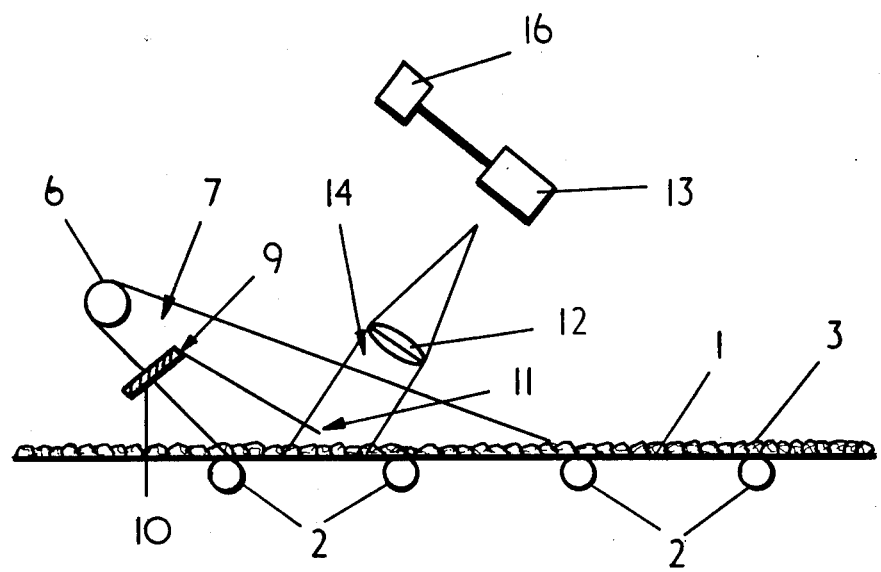

United States Patent [19]

Park et al.

[11] 4,070,575
[45] Jan. 24, 1978

[54] MEASUREMENT OF FLOW OF PARTICULATE MATERIAL BY SENSING THE SHADOW PROFILE

[75] Inventors: Andrew Howard Donaldson Park, Burton-on-Trent; Brian George Pidgeon, Barton-under-Needwood, both of England

[73] Assignee: Coal Industry (Patents) Ltd., London, England

[21] Appl. No.: 652,740

[22] Filed: Jan. 27, 1976

[30] Foreign Application Priority Data

Jan. 31, 1975 United Kingdom ............... 04313/75

[51] Int. Cl.² ..................... H01J 39/12; G01N 21/26
[52] U.S. Cl. ................................ 250/223 R; 250/577
[58] Field of Search ................... 250/223 R, 577, 576, 250/574, 222 PC, 578; 350/114; 356/209, 210

[56] References Cited

U.S. PATENT DOCUMENTS

| | | | |
|---|---|---|---|
| 2,604,809 | 7/1952 | Mitchell | 356/210 |
| 3,396,280 | 8/1968 | Knudsen | 250/223 R |
| 3,815,998 | 6/1974 | Tietze | 356/210 |
| 3,819,940 | 6/1974 | Laws | 250/578 |
| 3,917,942 | 11/1975 | McCay | 250/203 R |

*Primary Examiner*—Alfred E. Smith
*Assistant Examiner*—David K. Moore
*Attorney, Agent, or Firm*—James C. Wray

[57] ABSTRACT

A portion of a beam of light directed towards a flow of particulate material is interrupted with an edge such that the edge casts a shadow across the material. The shadow profile is sensed and a signal indicative of the sensed shadow profile is derived and monitored as a function of flow velocity to determine the volume of flow.

10 Claims, 2 Drawing Figures

MEASUREMENT OF FLOW OF PARTICULATE MATERIAL BY SENSING THE SHADOW PROFILE

The present invention relates to a method of and apparatus for measurement of flow of particulate material.

In particular, although not exclusively, the present invention relates to measurement of the volume of particulate material on a conveyor.

According to one aspect of the present invention a method of measuring flow of particulate material comprises directing a beam of light towards the flow of particulate material, interrupting a portion of the beam with an edge of a member such that the edge casts a shadow across the flow of particulate material, sensing the shadow profile, deriving a signal indicative of the shadow profile, and monitoring the derived signal as a function of flow velocity to determine the volume of flow.

According to another aspect of the present invention apparatus for carrying out the above method for measuring flow of particulate material comprises a light beam emitter for directing a light beam towards the flow of particulate material, a member having an edge for interrupting the emitted light beam such that in operation the edge casts a shadow across the flow of particulate material, a sensor for sensing the shadow profile and deriving a signal indicative of the shadow profile, and a monitor for receiving the derived signal as a function of flow velocity to determine the volume of flow.

Preferably the profile of the edge is straight.

Figure 2:
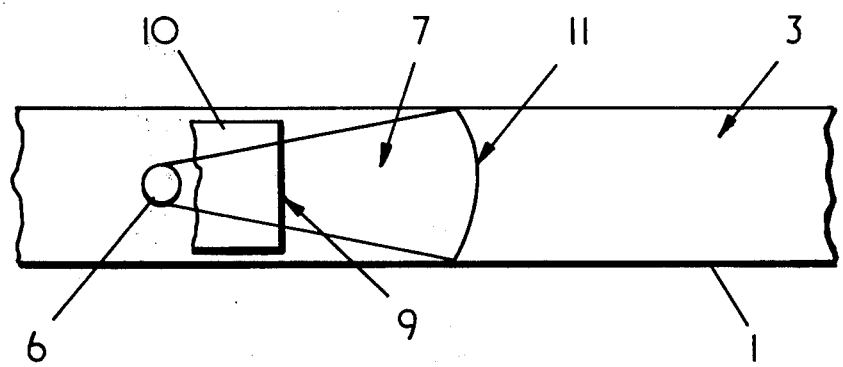

By way of example only, one embodiment of the present invention will be described with reference to the accompanying drawings in which:

FIG. 1 is a diagrammatic side view of apparatus constructed in accordance with the present invention; and FIG. 2 is an incomplete diagrammatic plan of FIG. 1 drawn on a slightly larger scale.

Referring to the drawings, a belt conveyor 1 supported on rollers 2 is shown loaded with a flow of particulate material 3, for example, run of mine coal.

A light beam emitter 6 is arranged over the conveyor belt so as to direct a light beam 7 towards the flow of particulate material 3. The lower portion of the light beam 7 is interrupted by a straight edge 9 of a member 10 supported by means (not shown) between the emitter and the conveyor belt. The straight edge casts a shadow profile 11 upon the flow of particulate material which varies directly depending upon the cross sectional area of the particulate material.

The continuously varying shadow profile is sensed by a sensor including a lens device 12 arranged in front of a photo-diode array instrument 13 which has an arrangement of photo-diode cells arranged to sense the intensity and configuration of light 14 reflected from the flow of particulate material and hence sense the shadow profile cast by the edge 9.

The sensor derives a signal indicative of sensed reflected light and, therefore, of the cast shadow profile, and feeds the derived signal to a monitor, for example, a computer 16, which considers the derived signal as a function of the particulate material flow velocity to determine the approximate volume of material conveyed in a unit time.

In other embodiments of the invention the photo-diode array is replaced by a television camera.

From the above description it will be appreciated that the present invention provides a relatively simple method and apparatus for measuring the approximate volume of particulate material on a conveyor belt, the accuracy of the measured volume being acceptable for many operational installations where the volume of relatively large amounts of particulate material requires to be known.

In addition, the present invention would lend itself to use in conjunction with belt weighing equipment to give bulk density measurements. This is important when handling particulate materials such as run of mine coal when bulk density measurements are used to give an indication of the ash content of the coal.

We claim:

1. A method of measuring flow of particulate material comprising directing a beam of light towards the flow of particulate material, interrupting a portion of the beam with an edge of a member such that the edge casts a shadow across the flow of particulate material, sensing the shadow profile, deriving a signal indicative of the shadow profile, and monitoring the derived signal as a function of flow velocity to determine the volume of flow.

2. Apparatus for measuring flow of particulate material comprising a light beam emitter for directing a light beam towards the flow of particulate material, a member having an edge for interrupting the emitted light beam such that in operation the edge casts a shadow across the flow of particulate material, a sensor for sensing the shadow profile and deriving a signal indicative of the shadow profile, and a monitor for receiving the derived signal as a function of flow velocity to determine the volume of flow.

3. Apparatus as claimed in claim 2, in which the profile of the edge is straight.

4. Apparatus as claimed in claim 2, in which the sensor comprises a lens device and a photo-diode array instrument.

5. Apparatus as claimed in claim 2 in which the light beam emitter is mounted to emit light at an angle to the flow of particulate material, and in which the sensor is mounted at an angle to the flow of particulate material.

6. Apparatus as claimed in claim 5 in which the angle of mounting of the light beam emitter and the angle of mounting of the sensor are similar.

7. Apparatus as claimed in claim 5 in which the member having an edge for interrupting the emitted light beam extends upward from a direction of particulate material into the light beam, and wherein the edge which casts a shadow across the flow of particulate material is uppermost on the member.

8. Apparatus as claimed in claim 2 in which the light beam emitter is positioned above particulate material, and in which the sensor is positioned above particulate material spaced from the light beam emitter, and in which the member is positioned above the particulate material and below the light beam emitter in a direction toward the sensor and wherein the edge which casts a shadow across the flow of particulate material is an upper edge of the member.

9. The method of measuring flow of particulate material of claim 1 wherein the interrupting step comprises interrupting a lower portion of the beam with an upper edge of a member.

10. The method of measuring flow of particulate material as claimed in claim 1 wherein the directing step comprises directing a light beam downward at an angle toward flow of particulate material, wherein the interrupting step comprises interrupting a lower portion of the light beam with a member whose upper edge casts a shadow across the flow of particulate material.

* * * * *